(12) United States Patent
Nakai et al.

(10) Patent No.: US 12,162,209 B2
(45) Date of Patent: Dec. 10, 2024

(54) METHOD FOR MANUFACTURING THREE-DIMENSIONAL STRUCTURE, AND 3D PRINTER FILAMENT

(71) Applicant: Mitsubishi Gas Chemical Company, Inc., Tokyo (JP)

(72) Inventors: Asami Nakai, Gifu (JP); Akio Ohtani, Gifu (JP); Hiroto Ito, Kanagawa (JP); Fumiya Hirano, Kanagawa (JP); Nobuki Hirooka, Kanagawa (JP); Nobuhiko Matsumoto, Hiratsuka (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 139 days.

(21) Appl. No.: 17/381,027

(22) Filed: Jul. 20, 2021

(65) Prior Publication Data

US 2021/0347111 A1    Nov. 11, 2021

Related U.S. Application Data

(62) Division of application No. 16/071,308, filed as application No. PCT/JP2017/001271 on Jan. 16, 2017, now Pat. No. 11,117,312.

(30) Foreign Application Priority Data

Jan. 22, 2016   (JP) ................. 2016-010238

(51) Int. Cl.
   *D02G 3/04*   (2006.01)
   *B29C 64/118*   (2017.01)
   (Continued)

(52) U.S. Cl.
   CPC .......... *B29C 64/118* (2017.08); *B29C 70/382* (2013.01); *B33Y 70/10* (2020.01);
   (Continued)

(58) Field of Classification Search
   CPC .......... D02G 3/04; D02G 3/045; D02G 3/187; D02G 3/36; D10B 2101/12; D10B 2331/02; Y10T 428/2936
   See application file for complete search history.

(56) References Cited

U.S. PATENT DOCUMENTS

5,454,846 A   10/1995   Roncato et al.
5,936,861 A   8/1999    Jang et al.
(Continued)

FOREIGN PATENT DOCUMENTS

CA    2904496 A1    4/2015
CN    105189842 A   12/2015
(Continued)

OTHER PUBLICATIONS

Alagirusamy, R. Das, A.. (2010). Technical Textile Yarns—Industrial and Medical Applications—1.3.4 Plied/folded yarn. Woodhead Publishing. Retrieved from https://app.knovel.com/hotlink/pdf/id:kt0092DRP1/technical-textile-yarns/braided-yarn (Year: 2010).*

(Continued)

*Primary Examiner* — Larissa Rowe Emrich
(74) *Attorney, Agent, or Firm* — Fitch, Even, Tabin & Flannery LLP

(57) ABSTRACT

Provided is the method for manufacturing a three-dimensional structure with a less amount of internal voids or bubbles, and also to provide a 3D printer filament used for manufacturing such three-dimensional structure. The method for manufacturing a three-dimensional structure, the method comprises melting and depositing a filament using a 3D printer, the filament comprising a commingled yarn that contains a continuous reinforcing fiber (A) and a continuous thermoplastic resin fiber (B), with a dispersity of the continuous reinforcing fiber (A) in the commingled yarn of 60 to 100%.

14 Claims, 3 Drawing Sheets

(51) Int. Cl.
  *B29C 70/38* (2006.01)
  *B33Y 70/10* (2020.01)
  *D02G 3/18* (2006.01)
  *D02G 3/40* (2006.01)
  *D02G 3/44* (2006.01)
  *B29K 77/00* (2006.01)
  *B29K 105/08* (2006.01)
  *B29K 307/04* (2006.01)
  *B29K 309/08* (2006.01)
  *B33Y 10/00* (2015.01)

(52) U.S. Cl.
  CPC ............... *D02G 3/04* (2013.01); *D02G 3/047* (2013.01); *D02G 3/402* (2013.01); *D02G 3/447* (2013.01); *B29K 2077/00* (2013.01); *B29K 2105/08* (2013.01); *B29K 2307/04* (2013.01); *B29K 2309/08* (2013.01); *B33Y 10/00* (2014.12); *D02G 3/182* (2013.01); *D10B 2101/12* (2013.01); *Y10T 428/2936* (2015.01)

(56) References Cited

U.S. PATENT DOCUMENTS

| | | | |
|---|---|---|---|
| 2006/0022370 A1* | 2/2006 | Wright | D02G 1/20 264/103 |
| 2013/0062806 A1* | 3/2013 | Mitadera | B29C 48/022 156/60 |
| 2013/0252497 A1 | 9/2013 | Schiebel et al. | |
| 2014/0050921 A1* | 2/2014 | Lyons | B22F 12/30 428/401 |
| 2014/0291886 A1 | 10/2014 | Mark et al. | |
| 2015/0182811 A1 | 7/2015 | Bender | |
| 2016/0010246 A1* | 1/2016 | Nakai | D02G 3/402 28/165 |
| 2016/0082641 A1 | 3/2016 | Bogucki et al. | |
| 2016/0082659 A1 | 3/2016 | Hickman et al. | |
| 2016/0237597 A1 | 8/2016 | Nakai et al. | |
| 2017/0210074 A1 | 7/2017 | Ueda et al. | |
| 2017/0259502 A1 | 9/2017 | Chapiro et al. | |

FOREIGN PATENT DOCUMENTS

| | | | | |
|---|---|---|---|---|
| DE | 102010052078 A1 | | 5/2012 | |
| JP | 2005179829 A | * | 7/2005 | |
| JP | 2008-240193 A | | 10/2008 | |
| JP | 2016-060204 A | | 4/2016 | |
| JP | 2016-193602 A | | 11/2016 | |
| RU | 2110625 C1 | | 5/1998 | |
| RU | 2216612 C2 | | 11/2003 | |
| WO | 99/39031 A1 | | 8/1999 | |
| WO | WO-2014136662 A1 | * | 9/2014 | ............ B29C 70/10 |
| WO | 2015/056642 A1 | | 4/2015 | |
| WO | 2015/077262 A1 | | 5/2015 | |
| WO | 2015/182675 A1 | | 12/2015 | |
| WO | 2016/129613 A1 | | 8/2016 | |

OTHER PUBLICATIONS

"JP2005179829_Machine Translation" is a machine translation of JP-2005179829-A. (Year: 2005).*

"Cord." Complete Textile Glossary, New York, NY: Celanese Acetate, 2001. N. pag. Print. (Year: 2001).*

Masahito Ueda et al., "Three-dimensional printing of a continuous fiber reinforced thermoplastic polymer by means of in-nozzle impregnation fused deposition modeling", Reinforced Plastics, vol. 61, No. 7, The Japan Reinforced Plastics Society, Jul. 2015.

International Preliminary Report on Patentability and Written Opinion issued in PCT/JP2017/001271 on Jul. 24, 2018 and English Translation (8 pages).

Extended European Search Report issued in corresponding European Application No. 17741354.9 on Jul. 24, 2019 (6 pages).

Office Action issued on Sep. 16, 2019, in corresponding Chinese Application No. 201780007632.2 (6 pages).

Office Action and Search Report issued on Feb. 10, 2020, in corresponding Russian Application No. 2018130063 (9 pages).

Examination Report issued on Jun. 28, 2021, in Russian Application No. 2018130063 (5 pages).

KPO; Application No. 10-2018-7020733: Office Action dated Sep. 21, 2022.

* cited by examiner

[Fig. 1]
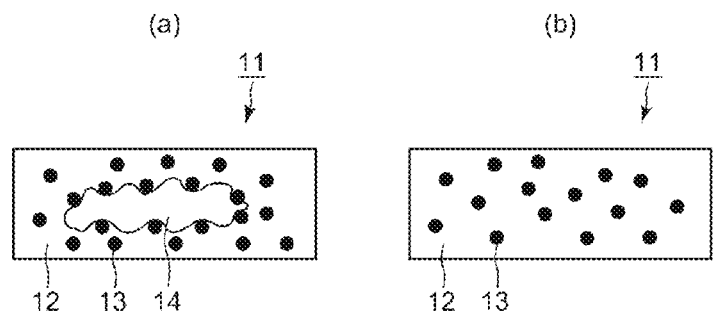
[Fig. 2]
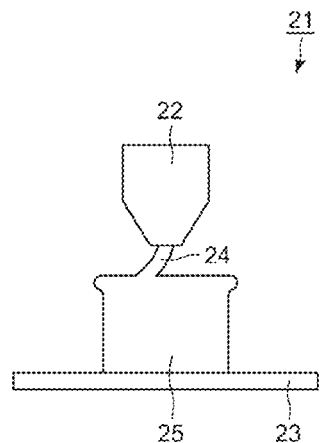
[Fig. 3]
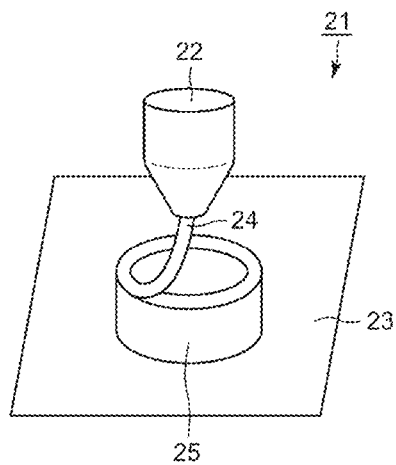

[Fig. 4]
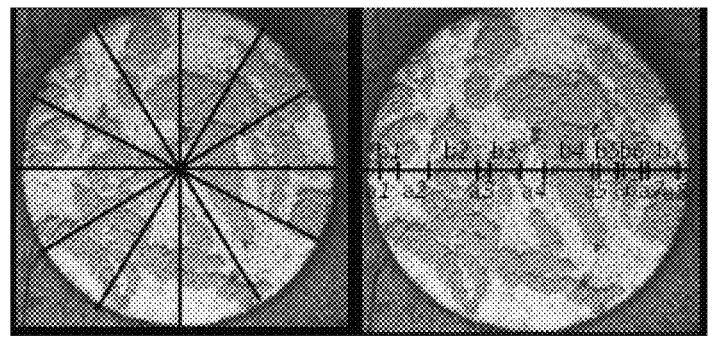
[Fig. 5]
(a)
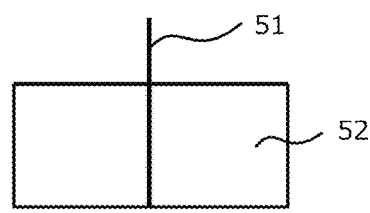
(b)
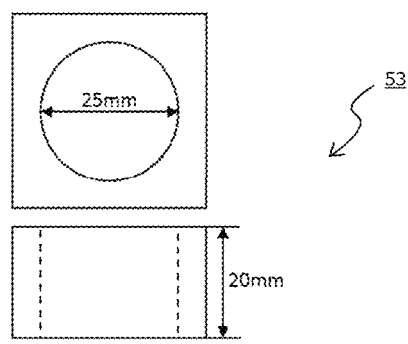
(c)
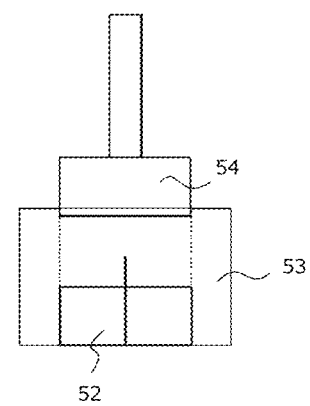

[Fig. 6]
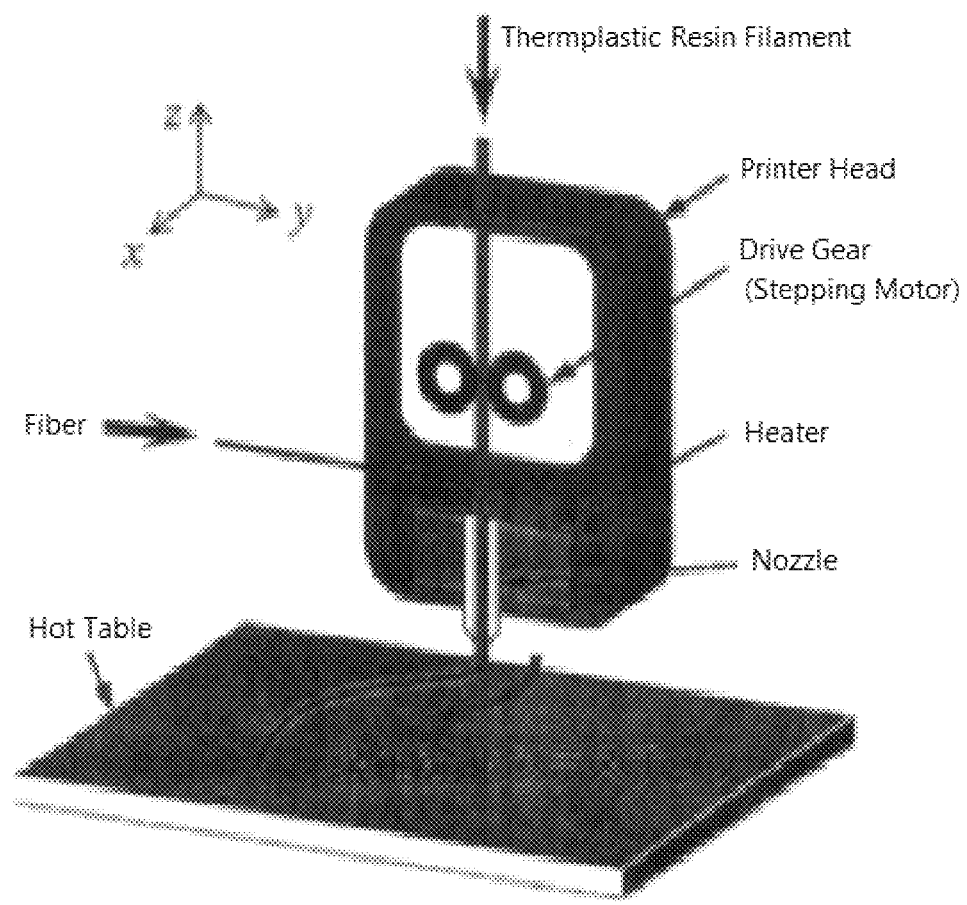

METHOD FOR MANUFACTURING THREE-DIMENSIONAL STRUCTURE, AND 3D PRINTER FILAMENT

CROSS-REFERENCE TO RELATED APPLICATIONS

This application is a division of U.S. application Ser. No. 16/071,308, filed Jul. 19, 2018, which is a U.S. national phase application filed under 35 U.S.C. § 371 of International Application Number PCT/JP2017/001271, filed Jan. 16, 2017, designating the United States, which claims priority from Japanese Application Number 2016-010238, filed Jan. 22, 2016.

FIELD OF THE INVENTION

This invention relates to a method for manufacturing a three-dimensional structure, and a 3D printer filament.

BACKGROUND OF THE INVENTION 3D printer is a sort of rapid prototyping machine (three-dimensional modeling machine) for manufacturing a three-dimensional structure (three-dimensional object) made of plastics or the like, making use of 3D data including CAD or CG data, created on computers, as design drawings.

The 3D printer is categorized by its deposition scheme. More specifically, one known category relates to 3D printers based on an ink jet UV curing system using a photocurable acrylic resin (for example, CONNEX and EDEN from Object Geometries Ltd., and AGILISTA-3000 from Keyence Corporation). Other category relates to 3D printers based on fused deposition modeling using thermoplastic resins such as acrylonitrile-butadiene-styrene resin (ABS), polycarbonate resin (PC), polyphenylsulfone resin (PPSF) (for example, FORTUS Series, Dimension Series and uPrint Series from Stratasys Ltd., and Solidoodle 3 from Solidoodle). Still other category relates to SLS (Selective Laser Sintering) system or SLM (Selective Laser Melting) system, by which powdery materials such as resin powder, or metal power such as copper, bronze, titanium and nickel powders are irradiated by high-output laser beam to cause sintering and melting (for example, SLS Series from 3D Systems Inc., RaFaEl 550 from ASPECT Inc., and EOSINT Series from EOS GmbH).

The 3D printer creates a geometry using a resin (ink) which is a material for the three-dimensional structures. For example, the resin (ink) used in the fused deposition modeling system is thermoplastic resin shaped into filament, such as ABS resin filament. According to the fused deposition modeling system, the thermoplastic resin filament is melted and concurrently discharged from the 3D printer, and is then built up so as to form a desired geometry on a substrate. The fused deposition modeling system can easily create a desired geometry, since the molten resin is discharged in its molten state onto the substrate.

The three-dimensional structure has been output from the 3D printer in a wide range of fields primarily in manufacturing industries as well as in the fields of construction, medical science, education and frontier researches, in such a way that parts of a certain product are output on a reduced scale allowed for the 3D printer, in order to verify design and functions, prior to actual-scale production. The three-dimensional structure has, however, been used for more precise verification, or even expected to be output as actual resin built-up article.

As applications of the 3D printer diversify, there has been an increasing demand for higher mechanical strength of the three-dimensional structure output from the 3D printer.

Non-Patent Literature 1 proposed a 3D printer based on the fused deposition modeling system, designed to independently feed fiber and thermoplastic resin filament. More specifically, as illustrated in FIG. 6, the thermoplastic resin filament is fed as an ink, the fiber is separately fed, they are heated together in a nozzle, and then built up on a hot table, to thereby manufacture the three-dimensional structure.

CITATION LIST

Patent Literature

[Non-Patent Literature 1] *Reinforced Plastics*, Vol. 61, No. 7 (July, 2015)

SUMMARY OF THE INVENTION

Investigations into Non-Patent Literature 1 by the present inventors, however, revealed that the three-dimensional structure obtained by the method described in Non-Patent Literature 1 was found to contain a large amount of voids or bubbles within the three-dimensional structure.

It is therefore an object of this invention to provide a method for manufacturing a three-dimensional structure with a less amount of internal voids or bubbles, and also to provide a 3D printer filament used for manufacturing such three-dimensional structure.

In addressing the above-described problem, the present inventors found from our investigations that the problem can be solved by using a 3D printer filament that contains a commingled yarn. More specifically, the above-described problem was found to be solve by <1> and <10>, and preferably by <2> to <9> and <11> to <18>.

<1> A method for manufacturing a three-dimensional structure, the method comprising melting and depositing a filament using a 3D printer, the filament comprising a commingled yarn that contains a continuous reinforcing fiber (A) and a continuous thermoplastic resin fiber (B), with a dispersity of the continuous reinforcing fiber (A) in the commingled yarn of 60 to 100%.

<2> The method for manufacturing a three-dimensional structure of <1>, wherein the filament has an elastic modulus of 10 MPa or larger, where the elastic modulus is measured by embedding an end of a 15 mm-long filament up to 10 mm-depth by a resin to form a 25 mm-diameter cylinder shape; by inserting the cylindrical resin part directed downward into a 25 mm-diameter, 20 mm-high cylindrical hole of a jig; by fitting a 25 mm-diameter disk-like weight from above the cylindrical resin part into the jig; and thereby applying load at a testing speed of 0.2 mm/min.

<3> The method for manufacturing a three-dimensional structure of <1> or <2>, wherein the filament contains a commingled yarn and a reinforcing member.

<4> The method for manufacturing a three-dimensional structure of <3>, wherein the reinforcing member is a thermoplastic resin fiber (C).

<5> The method for manufacturing a three-dimensional structure of any one of <1> to <4>, wherein the continuous reinforcing fiber (A) is longer than 30 mm.

<6> The method for manufacturing a three-dimensional structure of any one of <1> to <5>, wherein the continuous thermoplastic resin fiber (B) contains thermoplastic resin b as a constituent, which is a polyamide resin.

<7> The method for manufacturing a three-dimensional structure of any one of <1> to <5>, wherein the continuous thermoplastic resin fiber (B) contains thermoplastic resin b as a constituent, which is a polyamide resin that contains a structural unit derived from diamine and a structural unit derived from dicarboxylic acid, and, 50 mol % or more of the structural unit derived from diamine is derived from xylylenediamine.

<8> The method for manufacturing a three-dimensional structure of any one of <1> to <7>, wherein the continuous reinforcing fiber (A) is a carbon fiber or a glass fiber.

<9> The method for manufacturing a three-dimensional structure of any one of <1> to <7>, wherein the continuous thermoplastic resin fiber (B) has an impregnation rate of 80% or below.

<10> A 3D printer filament comprising a commingled yarn that contains a continuous reinforcing fiber (A) and a continuous thermoplastic resin fiber (B), with a dispersity of the continuous reinforcing fiber (A) in the commingled yarn of 60 to 100%.

<11> The 3D printer filament of <10>, wherein the filament has an elastic modulus of 10 MPa or larger, where the elastic modulus is measured by embedding an end of a 15 mm-long filament up to 10 mm-depth by a resin to form a 25 mm-diameter cylinder shape; by inserting the cylindrical resin part directed downward into a 25 mm-diameter, 20 mm-high cylindrical hole of a jig; by fitting a 25 mm-diameter disk-like weight from above the cylindrical resin part into the jig, to thereby apply load at a testing speed of 0.2 ram/min.

<12> The 3D printer filament of <10> or <11>, further comprising a reinforcing member for the commingled yarn.

<13> The 3D printer filament of <12>, wherein the reinforcing member is a thermoplastic resin fiber (C).

<14> The 3D printer filament of any one of <10> to <13>, wherein the continuous reinforcing fiber (A) is longer than 30 mm.

<15> The 3D printer filament of any one of <10> to <14>, wherein the continuous thermoplastic resin fiber (B) contains thermoplastic resin b as a constituent, which is a polyamide resin.

<16> The 3D printer filament of any one of <10> to <14>, wherein the continuous thermoplastic resin fiber (B) contains thermoplastic resin b as a constituent, which is a polyamide resin that contains a structural unit derived from diamine and a structural unit derived from dicarboxylic acid, and, 50 mol % or more of the structural unit derived from diamine is derived from xylylenediamine.

<17> The 3D printer filament of any one of <10> to <16>, wherein the continuous reinforcing fiber (A) is a carbon fiber or a glass fiber.

<18> The 3D printer filament of any one of <10> to <17>, wherein the continuous thermoplastic resin fiber (B) has an impregnation rate of 80% or below.

According to this invention, it now became possible to manufacture a three-dimensional structure with less amount of internal voids using a 3D printer. This invention also made possible to provide a 3D printer filament used for manufacturing such three-dimensional structure.

BRIEF DESCRIPTION OF DRAWINGS

FIG. 1 is a schematic cross sectional view of a three-dimensional structure manufactured by using a 3D printer. FIG. 1(a) illustrates an exemplary structure where a conventional 3D printer filament was used, and FIG. 1(b) illustrates an exemplary structure where the 3D printer filament of this invention was used.

FIG. 2 is a schematic drawing illustrating an exemplary 3D printer used in this invention.

FIG. 3 is a schematic drawing illustrating an exemplary 3D printer used in this invention.

FIG. 4 is a drawing illustrating an exemplary image processing according to a method for measuring dispersity.

FIG. 5 is a drawing illustrating a method for measuring elastic modulus of the 3D printer filament of this invention.

FIG. 6 is a schematic drawing illustrating a method for manufacturing a three-dimensional structure using a conventional 3D printer.

DESCRIPTION OF EMBODIMENTS

This invention will be detailed below. Note that all numerical ranges given in this specification, using "to" preceded and succeeded by numerals, are used to represent the ranges including these numerals respectively as the lower and upper limit values.

Method For Manufacturing a Three-Dimensional Structure

The method for manufacturing a three-dimensional structure of this invention includes melting and depositing a filament using a 3D printer, the filament includes a commingled yarn that contains a continuous reinforcing fiber (A) and a continuous thermoplastic resin fiber (B), with a dispersity of the continuous reinforcing fiber (A) in the commingled yarn of 60 to 100%.

With such design, it now becomes possible to manufacture a satisfactory three-dimensional structure that contains a reinforcing fiber.

According to the method described in Non-Patent Literature 1, the obtainable three-dimensional structure was suffering from large contents of internal voids or bubbles, meanwhile this invention can effectively suppress such voids or bubbles from occurring, by using the commingled yarn.

More specifically, the 3D printer that uses thermoplastic resins as an ink material discharges the 3D printer filament in a molten state, or melt the filament after being discharged. It has, however, been discussed in recent years to add fiber to the thermoplastic resin, from the viewpoint of improving mechanical strength of the three-dimensional structure. Now, in the process of separately feeding the fiber while feeding the thermoplastic resin filament as an ink, as previously described in Non-Patent Literature 1, the thermoplastic resin filament was found to be less infiltrative into the fiber, unless otherwise pressurized during or after the discharging, or unless otherwise infiltrated over a sufficient temporal duration, making the obtainable three-dimensional structure more likely to contain voids.

In more details, the continuous reinforcing fiber, typically fed in the form of bundle, entrains air. When the three-dimensional structure is manufactured by winding such continuous reinforcing fiber bundle around the thermoplastic resin filament, or by using a braid composed of such continuous reinforcing fiber bundle and the thermoplastic resin filament, the thermoplastic resin cannot easily infiltrate into the continuous reinforcing fiber. As a consequence, the air having been entrained in the continuous reinforcing fiber tends to remain in the three-dimensional structure. This will be detailed referring to FIG. 1. FIG. 1 is a schematic cross sectional view of a three-dimensional structure manufactured by using a 3D printer. In FIG. 1, reference numeral 11 represents a three-dimensional structure, 12 represents a thermoplastic resin, 13 represents a continuous reinforcing fiber, and 14 represents a void. FIG. 1(*a*) illustrates an exemplary case where an article composed of a thermoplastic resin filament wounded by a continuous reinforcing fiber bundle was used as the printer filament. As seen in FIG. 1(*a*), the air having been entrained in the continuous reinforcing fiber migrated towards the center of the three-dimensional structure 11, to form the void 14. The three-dimensional structure may even have bubbles formed therein, if the continuous reinforcing fiber bundle should contain moisture.

In contrast, FIG. 1(*b*) illustrates an exemplary case where the 3D printer filament of this invention was used. According to this invention, the obtainable three-dimensional structure will have less content of internal voids or bubbles as seen in FIG. 1(*b*), as a result of using the commingled yarn in which the continuous reinforcing fiber (A) and the thermoplastic resin fiber (B) are commingled thoroughly, which contributes to thorough impregnation.

The method for manufacturing the three-dimensional structure of this invention will be explained below, referring to FIG. 2 and FIG. 3. Note, however, that this invention is of course not limited to the structures illustrated in FIG. 2 and FIG. 3.

FIG. 2 and FIG. 3 are schematic drawings illustrating one example of the 3D printer employable in this invention. FIG. 2 and FIG. 3 are schematic drawings viewed from different directions. In FIG. 2 and FIG. 3, reference numeral 21 represents a 3D printer, 22 represents a 3D printer nozzle, 23 represents a 3D printer stage, 24 represents the filament of this invention, and 25 represents a three-dimensional structure.

The filament 24 is melted in the nozzle 22. Melting means that at least a part of thermoplastic resin b, which composes the thermoplastic resin fiber (B) contained in the commingled yarn, comes into a molten state, preferably 80% by weight or more of the thermoplastic resin b melts, more preferably 95% by weight or more thereof melts, and even more preferably 99% by weight or more thereof melts. More specifically, the filament is preferably heated at a temperature 10° C. or more higher than the melting point of thermoplastic resin b, and more preferably heated at a temperature 15° C. to 60° C. higher than the melting point of thermoplastic resin b. When the filament contains thermoplastic resin fiber (C) as the reinforcing member as detailed later, it is preferable that also at least a part of the thermoplastic resin c, which composes the thermoplastic resin fiber (C), comes into a molten state, preferably 80% by weight or more thereof melts, more preferably 95% by weight or more thereof melts, and even more preferably 98% by weight or more thereof melts.

The molten filament 24 is built up on the stage 23. As illustrated in FIG. 3, the filament 24 is discharged so as to build a desired three-dimensional structure 25.

Since this invention employs the commingled yarn in which the continuous reinforcing fiber (A) and the continuous thermoplastic resin fiber (B) are dispersed with each other, so that, in the process of melting and deposition of the thermoplastic resin b, the continuous thermoplastic resin fiber (B) can be impregnate into the continuous reinforcing fiber (A). Hence, the continuous thermoplastic resin fiber (B) can be infiltrated without thorough pressurizing or without spending a sufficient temporal duration, unlike the case where the continuous reinforcing fiber and the continuous thermoplastic resin fiber are separately fed, or the case where a braid composed of the continuous reinforcing fiber and the continuous thermoplastic resin fiber is used. Thus the three-dimensional structure with a less content of void may be obtained.

In this embodiment, the filament is preferably melted by heating the inside of the nozzle, when the filament is discharged.

The filament may alternatively be melted after being discharged from the nozzle, rather than being melted within the nozzle. The melting in this case preferably relies upon laser irradiation. The laser irradiation may be given after the filament is discharged from the nozzle and before being built up on the substrate, or may be given after built up on the substrate, or may be given on both points in time.

Referring now back to FIG. 2, the three-dimensional structure 25 in the process of building would warp, because the thermoplastic resin is not yet completely cured. Hence when the three-dimensional structure is manufactured, it is also preferable to heat the stage 23. The heating temperature in this case is preferably 15 to 150° C. lower, and more preferably 30 to 100° C. lower, than the temperature at which the filament can melt. The three-dimensional structure of this invention has advantages of low shrinkage and low warpage, due to continuous reinforcing fiber contained therein. As a consequence, the three-dimensional structure is effectively prevented from separating from the stage 23.

The heating temperature of the stage is typically 50 to 100° C., and also may be 55 to 90° C.

Also an embodiment without heating the stage is of course within the scope of this invention.

The three-dimensional structure may be deposited directly on the surface of the stage 23, or may be deposited on a film placed on the surface of the stage 23. The film is exemplified by metal foil and resin film, wherein aluminum foil, polyimide film, and fluorine-containing resin film are preferable. The resin film is commercially available, for example, under the names of Kapton (registered trademark) film and Teflon (registered trademark) film. Meanwhile, materials for composing the stage are exemplified by metals, wherein aluminum and steel are preferable.

The stage may have the surface treated, for the purpose of improving adhesiveness with the filament. The surface treatment is exemplified by physical treatment and chemical treatment. Specific examples of the surface treatment include texturing or embossing of the surface of resin film; corona discharge treatment; and filing of the surface of metal foil.

The filament used in this invention will be detailed later.

As the 3D printer 21, those applicable to fused deposition modeling system and those applicable to the SLM method are preferably used. Commercially available 3D printers based on the fused deposition modeling system are exemplified by FORTUS Series, Dimension Series and uPrint Series from Stratasys Ltd.; and Solidoodle 3 from Solidoodle. Commercially available 3D printers based on the SLM system are exemplified by SLS Series from 3D Systems, Inc.; RaFaEl 550 from ASPECT, Inc.; and EOSINT Series from EOS GmbH.

The three-dimensional structure 25 may be manufactured by using a supporting member that supports a space part of the three-dimensional structure 25. When the supporting member is used, the filament is discharged onto the surface of the supporting member. Acryl resin is typically used as the supporting member.

Since the filament contains the continuous reinforcing fiber, this invention also takes an advantage over the case of using the conventional filament, in that it is allowed for a wider variety of geometries obtainable without using the supporting member.

The geometry of the three-dimensional structure obtainable in this invention may have the thinnest part of 5 mm thick or below, which may even be 3 mm thick or below, although not specifically limited. The lower limit value of the thickness of the thinnest part may be, but not limitatively, 0.5 mm or above.

The three-dimensional structure obtained in this embodiment may widely be used for articles made of fiber-reinforced resin. Applicable fields include automobile and other transport equipment parts, general machinery parts, precision equipment parts, electronic/electric equipment parts, office automation equipment parts, building material/housing equipment parts, medical device, leisure time/sport goods, playing tools, medical supplies, daily goods including food wrapping film, and defense/aerospace products, but not specifically limited thereto. It is also suitably applicable to prototypes of these products.

3D Printer Filament

Next, the 3D printer filament of this invention will be explained.

The 3D printer filament of this invention includes, as its feature, the commingled yarn that contains the continuous reinforcing fiber (A) and the continuous thermoplastic resin fiber (B), with a dispersity of the continuous reinforcing fiber (A) in the commingled yarn of 60 to 100%. With such design, the obtainable three-dimensional structure will have a less amount of internal voids. The invention also makes it possible to manufacture satisfactory three-dimensional structures, by using any known types of 3D printers based on fused deposition modeling or the SLM system, occasionally with a slight modification.

The diameter of the 3D printer filament may suitably be determined, depending on applications or nozzles to be used, and may preferably be 0.5 mm or above at lowest, more preferably 0.7 mm or above, and may even be 1.1 mm or above. The filament diameter is preferably 3.0 mm or below at highest, more preferably 2.5 mm or below, and may even be 2.0 mm or below. When the 3D printer based on the fused deposition modeling is used, the cross sectional shape of the 3D printer filament is variable depending on the shape of outlet of the nozzle, which is typically circular.

Ratio of the continuous reinforcing fiber (A) in the 3D printer filament is preferably 10 to 90% by weight, more preferably 20 to 80% by weight, and even more preferably 30 to 70% by weight.

Weight per one meter of the 3D printer filament is preferably 0.01 to 40 g, more preferably 0.1 to 5 g, and even more preferably 0.5 to 2 g.

The filament of this invention preferably has an elastic modulus of 10 MPa or larger. With such design, the filament will have a reasonable level of rigidity, and can easily migrate inside the 3D printer. More specifically, although the ordinary filament is filamentous and may sometimes entangle or curl, now the discharging property may be improved by controlling the elastic modulus to the above-described value or above. The elastic modulus of the filament is preferably 10 MPa or above at lowest, more preferably 50 MPa or above, even more preferably 1,000 MPa or above, and yet more preferably 1,500 MPa or above. Meanwhile the elastic modulus of the filament is preferably 10,000 MPa or below at highest, more preferably 8,000 MPa or below, even more preferably 6,000 MPa or below, and may even be 3,500 MPa or below. By controlling the elastic modulus to 10,000 MPa or below, the filament will be flexible, and will tend to improve the discharging property.

The elastic modulus of the filament is measured by embedding an end of a 15 mm-long filament up to 10 mm-depth by a resin to form a 25-mm-diameter cylinder; by inserting the cylindrical resin part directed downward into a 25 mm-diameter, 20 mm-high cylindrical hole of a jig; by fitting a 25 mm-diameter disk-like weight from above the cylindrical resin part into the jig, to thereby apply load at a testing speed of 0.2 mm/min. In more details, the measurement follows the method described later. The loading range may appropriately be determined by those skilled in the art, depending on expected levels of the elastic modulus. In this invention, the loading range is exemplified by 50 N, 100 N and 1 kN.

Method for improving the elastic modulus of the filament to the above described value or more will be described below.

First embodiment of this invention relates to use of the reinforcing member for the commingled yarn. The reinforcing member is preferably the thermoplastic resin fiber (C). More specifically, exemplified are a filament having the commingled yarn applied to at least a part of the surface of the thermoplastic resin fiber (C); and a filament having entangled therein the thermoplastic resin fiber (C) and the commingled yarn.

The filament, having the commingled yarn applied to at least a part of the surface of the thermoplastic resin fiber (C), is exemplified by a fiber having the commingled yarn bonded to at least a part of the surface of the thermoplastic resin fiber (C); and a fiber having the commingled yarn wound around the thermoplastic resin fiber (C). In this invention, preferable is a fiber having the commingled yarn spirally wound around the surface of the thermoplastic resin fiber (C), at regular pitches. Now "bonding" may be accomplished by using a bonding medium between the thermoplastic resin fiber (C) and the commingled yarn, or by heat-sealing the commingled yarn with the thermoplastic resin fiber (C). In the filament having the commingled yarn applied to at least a part of the surface of the thermoplastic resin fiber (C), the commingled yarn might unevenly disperse when viewed in a cross section taken normal to the longitudinal direction of the thermoplastic resin fiber (C). Even in this case, in general the commingled yarn will reasonably be incorporated into the thermoplastic resin fiber (C) when the 3D printer filament is melted, and thereby the three-dimensional structure will be manufactured in which the continuous reinforcing fiber (A) is dispersed with a practically acceptable degree of uniformity.

The bonding medium is preferably at least one of a treatment agent for the thermoplastic resin fiber (C), a treatment agent for the continuous reinforcing fiber (A), and a treatment agent for the continuous thermoplastic resin fiber (B).

Heat sealing temperature in the process of heat sealing is preferably 10 to 50° C. higher than the melting point of the thermoplastic resin fiber (B) or the melting point of the thermoplastic resin fiber (C), whichever is lower. Temporal duration of heat sealing is preferably 0.01 to 10 seconds or around. Making reference to the resin having the lower melting point, the three-dimensional structure will be more able to keep its shape. This is also preferable from the viewpoint of energy efficiency.

The filament having the thermoplastic resin fiber (C) and the commingled yarn entangled therein is exemplified by braid and twisted cord composed of the thermoplastic resin fiber (C) and the commingled yarn.

When the thermoplastic resin fiber (C) is used as the reinforcing member, ratio of the commingled yarn in the 3D printer filament is preferably 10 to 90% by weight, and more preferably 20 to 80% by weight.

The thermoplastic resin fiber (C) will be detailed later.

Another embodiment without using the reinforcing member will be achieved by using the commingled yarn in which the continuous reinforcing fiber (A) of approximately 20 to 30 mm long is dispersed into the continuous thermoplastic resin fiber (B), and kept in shape with the thermoplastic resin fiber, in which the ratio of thermoplastic resin fiber used for shape retention is increased. The commingled yarn, in which the continuous reinforcing fiber (A) of approximately 20 to 30 mm long is dispersed in the continuous thermoplastic resin fiber (B), and kept in shape with the thermoplastic resin fiber, will be detailed later.

Still another embodiment without using the reinforcing member is exemplified by a filament in which a plurality of commingled yarns are entangled. The mode of entanglement of the plurality of commingled yarns is exemplified by braiding or twisting the commingled yarns. The braid thus obtained will have no core made of continuous reinforcing fiber, but instead have the core and the surrounding yarns both composed of commingled yarns.

Another possible method would relate to heat treatment of the commingled yarn alone by itself. In this case, the commingled yarn preferably has a fineness of approximately 10,000 to 50,000 dtex. Heat treatment temperature in this case is preferably 10 to 50° C. higher than the melting point of the thermoplastic resin b that composes the thermoplastic resin fiber (B), or the melting point of the thermoplastic resin c that composes the thermoplastic resin fiber (C), whichever is lower. The temporal duration of heat sealing is preferably 0.01 to 10 seconds.

<Commingled Yarn>

The commingled yarn used in this invention contains the continuous reinforcing fiber (A) and the continuous thermoplastic resin fiber (B), wherein the continuous reinforcing fiber (A) is dispersed in the continuous thermoplastic resin fiber (B), and, a part of, or the entire portion of the continuous thermoplastic resin fiber (B) remain in the fiber form, rather than being infiltrated into the continuous reinforcing fiber (A). Note that the commingled yarn used in this invention allows that the continuous reinforcing fiber (A) and a part of the continuous thermoplastic resin fiber (B) may be entangled, without departing from the spirit of this invention.

The dispersity of the continuous reinforcing fiber in the commingled yarn is 60 to 100%, preferably 60 to 99%, more preferably 63 to 99%, and even more preferably 68 to 99%. Within these ranges, the continuous thermoplastic resin fiber (B) will be more likely to infiltrate into the continuous reinforcing fiber (A), and thereby the obtainable three-dimensional structure will have a lesser amount of voids.

The dispersity in the context of this invention means a value measured by a method described later in EXAMPLES.

The impregnation rate of the continuous thermoplastic resin fiber (B) in the commingled yarn, which is a starting material used for the filament of this invention, is typically 80% or below. The upper limit value of the impregnation rate is preferably 70% or below, and more preferably 60% or below. The lower limit value of the impregnation rate is preferably 0% or above. In the commingled yarn of this invention, the degree of impregnation may be significantly large, or may be significantly small. A large impregnation rate of the commingled yarn may shorten the manufacturing time of the three-dimensional structure, and may improve the productivity. Meanwhile, a small impregnation rate of the commingled yarn makes it highly flexible, therefore makes the reinforcing fiber less likely to break, and thereby good operability and good physical properties of the built-up article are suitably balanced. In this invention, also the commingled yarn having a small impregnation rate may be used for the filament, after being enhanced in the impregnation rate under heating when the commingled yarn is heat-sealed with the thermoplastic resin fiber (C).

The impregnation rate of the continuous thermoplastic resin fiber (B) in the filament after being incorporated therein may be equivalent to the impregnation rate of the starting commingled yarn, or may further be increased.

More specifically, the impregnation rate of the continuous thermoplastic resin fiber (B) in the commingled yarn in the filament may be suitably determined within the range from 80% to 0%, depending on applications.

A first preferred embodiment of the impregnation rate in this invention is 0% or larger, and smaller than 10%. Within such range, the commingled yarn will be highly flexible, making the reinforcing fiber less likely to break, and thereby the obtainable three-dimensional structure will have no irregularity on the surface, and will more easily be obtained as designed.

A second preferred embodiment of the impregnation rate in this invention is 30% or larger, and smaller than 80%. Within such range, the three-dimensional structure will be manufactured within a shorter time, and will improve the productivity.

A third preferred embodiment of the impregnation rate in this invention is 10% or larger, and smaller than 30%. Within such range, advantages of the first embodiment and the second embodiment may suitably be balanced.

The impregnation rate in the context of this invention means a value measured by a method described later in EXAMPLES.

In the commingled yarn used in this invention, the continuous reinforcing fiber (A) or the continuous thermoplastic resin fiber (B) accounts for 95% by weight or more of the continuous reinforcing fiber that composes the commingled yarn.

The commingled yarn used in this invention preferably is an article in which the continuous reinforcing fiber (A) and the continuous thermoplastic resin fiber (B) are bundled with the aid of at least one of treatment agents used for the continuous reinforcing fiber (A) and the continuous thermoplastic resin fiber (B).

Ratio of the continuous reinforcing fiber (A) in the commingled yarn is preferably 10% by weight or above, more preferably 15% by weight or above, even more preferably 20% by weight or above, yet more preferably 30% by weight or above, furthermore preferably 40% by weight or above, particularly preferably 50% by weight or above, and may even be 55% by weight or above. The upper limit of the ratio of the continuous reinforcing fiber (A) in the commingled yarn is preferably 90% by weight or below, more preferably 80% by weight or below, even more preferably 70% by weight or below, and may even be 65% by weight or below.

The ratio of the continuous thermoplastic resin fiber (B) in the commingled yarn is preferably 10% by weight or above, more preferably 20% by weight or above, even more preferably 30% by weight or above, and may be 35% by weight or above. The upper limit of the ratio of the continuous thermoplastic resin fiber (B) is preferably 90% by weight or below, more preferably 85% by weight or below, even more preferably 80% by weight or below, yet more preferably 70% by weight or below, furthermore preferably 60% by weight or below, particularly preferably 50% by weight or below, and may even be 45% by weight or below.

The commingled yarn is manufactured in most cases by using continuous thermoplastic resin fiber bundle and the continuous reinforcing fiber bundle. Total fineness of fibers used for manufacturing a single commingled yarn (the sum of the total fineness of the continuous thermoplastic resin fiber and the total fineness of the continuous reinforcing fiber, both used for manufacturing a single commingled yarn, that is, the fineness of commingled yarn) is preferably 1,000 to 100,000 dtex, more preferably 1,500 to 50,000 dtex, even more preferably 2,000 to 50,000 dtex, and particularly preferably 3,000 to 30,000 dtex.

Ratio of the total fineness of the continuous thermoplastic resin fiber and the total fineness of the continuous reinforcing fiber, both used for manufacturing a single commingled yarn (total fineness of continuous thermoplastic resin fiber/total fineness of continuous reinforcing fiber) is preferably 0.1 to 10, more preferably 0.1 to 6.0, and even more preferably 0.5 to 2.0.

The total number of fibers used for manufacturing a single commingled yarn (the sum of the total number of fibers of continuous thermoplastic resin fiber and the total number of fibers of continuous reinforcing fiber) is preferably 100 to 100,000 f, more preferably 1,000 to 100,000 f, even more preferably 1,500 to 70,000 f, and yet more preferably 2,000 to 20,000 f. Within these ranges, the commingled yarn will have improved commingling performance, and thereby the obtainable three-dimensional structure will have improved physical properties and texture. It will also have less region in which either fiber unevenly disperses, instead allowing both fibers to disperse into each other more easily.

Ratio of the total number of fibers of the continuous thermoplastic resin fiber and the total number of fibers of the continuous reinforcing fiber (total number of fibers of continuous thermoplastic resin fiber/total number of fibers of continuous reinforcing fiber), both used for manufacturing a single commingled yarn, is preferably 0.001 to 1, more preferably 0.001 to 0.5, and even more preferably 0.05 to 0.2. Within these ranges, the commingled yarn will have improved commingling performance, and thereby the obtainable three-dimensional structure will have improved physical properties and texture. The continuous thermoplastic resin fiber and the continuous reinforcing fiber preferably disperse evenly in the commingled yarn. Within the above described ranges, these fibers will be more likely to disperse evenly.

The commingled yarn used in this invention may be twisted. Method for twisting is selectable from any known methods without special limitation. Number or turns of twisting is suitably determined depending on types of the thermoplastic resin b used for the continuous thermoplastic resin fiber (B); number of fibers and fineness of the thermoplastic resin fiber bundle; types, number of fibers and fineness of the continuous reinforcing fiber (A); and ratio of numbers of fibers, or the ratio of fineness values of the continuous thermoplastic resin fiber (B) and the continuous reinforcing fiber (A), which may typically be 1 to 200 turns/m (fiber length), may even be 1 to 100 turns/m, may further be 1 to 70 turns/m, and may particularly be 1 to 50 turns/m. With such design, the obtainable three-dimensional structure will have improved mechanical strength.

The continuous reinforcing fiber (A) and/or the continuous thermoplastic resin fiber (B), used for the commingled yarn, are preferably surface-treated using the treatment agent as described above. With such design, the obtainable commingled yarn will have the continuous reinforcing fiber (A) and the continuous thermoplastic resin fiber (B) more uniformly dispersed therein, and, the impregnation rate of the continuous thermoplastic resin fiber (B) into the continuous reinforcing fiber (A) will further be improved.

In addition, the commingled yarn may contain any components other than the continuous reinforcing fiber (A), the continuous thermoplastic resin fiber (B), treatment agent for the continuous reinforcing fiber (A), and the treatment agent for the continuous thermoplastic resin fiber (B). Specific examples include carbon fiber staple, carbon nanotube, fullerene, micro-cellulosic fiber, talc and mica. Amount of addition of such other components is preferably 5% by weight or less of the commingled yarn.

As one example of the commingled yarn of this invention, exemplified is a commingled yarn that includes the continuous reinforcing fiber (A) and the continuous thermoplastic resin fiber (B), wherein the dispersity of the continuous reinforcing fiber in the commingled yarn is 60 to 100%, the continuous thermoplastic resin fiber (B) does not substantially infiltrate in the continuous reinforcing fiber, and the continuous thermoplastic resin fiber (B) is longer than 30 mm.

As the commingled yarn used in this invention, also preferably used is a commingled yarn in which the continuous reinforcing fiber of approximately 20 to 30 mm long is dispersed in the thermoplastic resin fiber (B), and kept in shape with the thermoplastic resin fiber. The thermoplastic resin fiber that takes part in keeping the shape is preferably defined by the same ranges as the thermoplastic resin fiber (C) described later. For keeping of the shape, a dispersion of the continuous reinforcing fiber of approximately 20 to 30 mm long, in the thermoplastic resin fiber (B), is preferably wound up by the thermoplastic resin fiber.

<<Continuous Reinforcing Fiber (A)>>

The commingled yarn used in this invention contains the continuous reinforcing fiber (A). The continuous reinforcing fiber (A) in this invention means a continuous reinforcing fiber having a fiber length exceeding 6 mm, and more preferably having a fiber length exceeding 30 mm. The fiber length in the context of this invention means number-average fiber length, unless otherwise specifically noted. The average fiber length of the continuous reinforcing fiber (A) used in this invention is preferably, but no limitatively, within the range from 1 to 20,000 m, more preferably 100 to 10,000 m, and even more preferably 1,000 to 7,000 m, from the viewpoint of improving the buildability.

One example of the continuous reinforcing fiber used in this invention relates to a continuous reinforcing fiber bundle in which a plurality of continuous reinforcing fibers are gathered into an bundle. In this embodiment, the continuous reinforcing fiber preferably has a fiber length of 1 m or longer.

Another example of the continuous reinforcing fiber used this invention relates to a continuous reinforcing fiber of 30 to 150 mm long. Such continuous reinforcing fiber is exemplified by "stretch-broken carbon fiber".

The continuous reinforcing fiber (A) used in this invention preferably has a total fineness per a single commingled yarn of 100 to 50,000 dtex, more preferably 500 to 40,000 dtex, and even more preferably 1,000 to 10,000 dtex. Within these ranges, the continuous reinforcing fiber (A) will more easily be processed, and the obtainable commingled yarn will have improved elastic modulus and improved strength.

The continuous reinforcing fiber (A) used in this invention preferably has the total number of fibers per a single commingled yarn of 500 to 50,000 f, which is more preferably 500 to 20,000 f, even more preferably 700 to 15,000 f, and particularly preferably 700 to 7,000 f. Within these ranges, the continuous reinforcing fiber (A) will disperse in the commingled yarn in a more successful manner.

In order to make the continuous reinforcing fiber (A) satisfy a predetermined total fineness and a predetermined total number of fibers in a single commingled yarn, the continuous reinforcing fiber (A) may be manufactured by using a single continuous reinforcing fiber bundle, or may be manufactured by using a plurality of continuous reinforcing fiber bundles. In this invention, the continuous reinforcing fiber (A) is preferably manufactured by using 1 to 10 continuous reinforcing fiber bundles, more preferably by using 1 to 3 continuous reinforcing fiber bundles, and even more preferably by using a single continuous reinforcing fiber bundle.

The continuous reinforcing fiber (A) is exemplified by inorganic fibers such as glass fiber, carbon fiber, alumina fiber, boron fiber, ceramic fiber, and metal fiber (steel fiber, etc.); and organic fibers such as botanical fiber (Kenaf, bamboo fiber, etc.), aramid fiber, polyoxymethylene fiber, aromatic polyamide fiber, polyparaphenylene benzobisoxazole fiber, and ultra-high molecular weight polyethylene fiber. Among them, preferable is at least one fiber selected from carbon fiber, aramid fiber and glass fiber, and more preferably at least one of carbon fiber or glass fiber. In particular, carbon fiber is more preferably used for its excellent properties including light weight, high strength and large elastic modulus. As the carbon fiber, preferably used are polyacrylonitrile-based carbon fiber and pitch-based carbon fiber. Also carbon fibers derived from botanical raw materials, such as lignin and cellulose, may be used.

<<Treatment Agent for Continuous Reinforcing Fiber (A)>>

The continuous reinforcing fiber (A) used in this invention is preferably being treated with a treatment agent. Such treatment agent is exemplified by sizing agent and surface treatment agent, preferably by those described in paragraphs [0093] and [0094] of JP-B1-4894982, the contents of which are incorporated by reference into this specification.

More specifically, the treatment agent used in this invention is preferably at least one selected from epoxy resin, urethane resin, silane coupling agent, water-insoluble polyamide resin and water-soluble polyamide resin; more preferably at least one selected from epoxy resin, urethane resin, water-insoluble polyamide resin and water-soluble polyamide resin; and even more preferably water-soluble polyamide resin.

The epoxy resin is exemplified by glycidyl compounds such as epoxyalkane, alkane diepoxide, bisphenol A-glycidyl ether, bisphenol A-glycidyl ether dimer, bisphenol A-glycidyl ether trimer, bisphenol A-glycidyl ether oligomer, bisphenol A-glycidyl ether polymer, bisphenol F-glycidyl ether, bisphenol F-glycidyl ether dimer, bisphenol F-glycidyl ether trimer, bisphenol F-glycidyl ether oligomer, bisphenol F-glycidyl ether polymer, glycidyl stearate, phenyl glycidyl ether, ethylene oxide lauryl alcohol glycidyl ether, ethylene glycol diglycidyl ether, polyethylene glycol diglycidyl ether, and propylene glycol diglycidyl ether; glycidyl ester compounds such as glycidyl benzoate, glycidyl p-toluate, glycidyl stearate, glycidyl laurate, glycidyl palmitate, glycidyl oleate, glycidyl linoleate, glycidyl linoleate, and diglycidyl phthalate; and glycidylamine compounds such as tetraglycidylaminodiphenylmethane, triglycidylaminophenol, diglycidylaniline, diglycidyltoluidine, tetraglycidylmetaxylenediamine, triglycidylcyanurate, and triglycidylisocyanurate.

The urethane resin employable here is obtained by allowing polyol, or polyol obtained by transesterification between oil/fat, to react with polyhydric alcohol.

The polyisocyanate is exemplified by aliphatic isocyanates such as 1,4-tetramethylene diisocyanate, 1,6-hexamethylene diisocyanate, 2,2,4-trimethylhexamethylene diisocyanate, and 2,8-diisocyanato methyl caproate; alicyclic diisocyanates such as 3-isocianato methyl-3,5,5-trimethyl-cyclohexyl isocyanate, and methylcyclohexyl-2,4-diisocyanate; aromatic diisocyanates such as toluylene diisocyanate, diphenylmethane diisocyanate, 1,5-naphthene diisocyanate, diphenylmethylmethane diisocyanate, tetraalkyl diphenylmethane diisocyanate, 4,4-dibenzyl diisocyanate, and 1,3-phenylene diisocyanate; chlorinated diisocyanates, and brominated diisocyanates, all of which may be used independently, or two or more compounds may be combined for use.

The polyol is exemplified by a variety of polyols generally used for manufacturing urethane resin, including diethylene glycol, butanediol, hexanediol, neopentyl glycol, bisphenol A, cyclohexane dimethanol, trimethylolpropane, glycerin, pentaerythritol, polyethylene glycol, polypropylene glycol, polyester polyol, polycaprolactone, polytetramethylene ether glycol, polythioether polyol, polyacetal polyol, polybutadiene polyol, and furandimethanol, all of which may be used independently, or two or more compounds may be combined for use.

The silane coupling agent is exemplified by trialkoxy or triaryloxy silane compounds such as aminopropyltriethoxysilane, phenylaminopropyltrimethoxysilane, glycidyl propyltriethoxysilane, metacryloxypropyltrimethoxysilane, and vinyltriethoxysilane; ureidosilane; sulfidosilane; vinylsilane; and imidazole-silane.

Now, the water-insoluble polyamide resin means that, when 1 g of the polyamide resin is dissolved in 100 g of water at 25° C., 99% by weight or more of which remains insoluble.

When the water-insoluble polyamide resin is used, it is preferable to disperse or suspend the water-insoluble polyamide resin in a powdery form into water or organic solvent. The commingled yarn may be prepared by immersing the mixed fiber bundle into such dispersion or suspension of the powdery water-insoluble polyamide resin, followed by drying.

The water-insoluble polyamide resin is typically an article obtained by emulsifying and dispersing powder of polyamide 6, polyamide 66, polyamide 610, polyamide 11, polyamide 12, xylylenediamine-based polyamide resin (preferably, polyxylylene adipamide, and polyxylylene sebacamide) or copolymer of them, by adding thereto a surfactant such as nonionic, cationic or anionic one, or a mixture of them. The water-insoluble polyamide resin is commercially available, for example, in the form of water-insoluble nylon emulsion, and is exemplified by Sepolsion PA from Sumitomo Seika Chemicals Co., Ltd., and Michem Emulsion from Michaelman Inc.

Now, the water-soluble polyamide resin means that, when 1 g of the polyamide resin is dissolved in 100 g of water at 25° C., 99% by weight or more of which dissolves into water.

The water-soluble polyamide resin is exemplified by modified polyamides such as acrylic acid-grafted N-methoxymethylated polyamide resin, and amido group-added N-methoxymethylated polyamide resin. The water-soluble polyamide resin is commercially available under the name AQ-nylon from Toray Industries, Inc., and Toresin from Nagase ChemteX Corporation.

The amount of consumption of the treatment agent is preferably 0.001 to 1.5% by weight of the continuous reinforcing fiber (A), which is more preferably 0.1 to 1.2% by weight, and even more preferably 0.5 to 1.1% by weight. Within these ranges, the continuous reinforcing fiber (A)

<<Method for Treating Continuous Reinforcing Fiber (A) with Treatment Agent>>

The continuous reinforcing fiber (A) may be treated with the treatment agent by any of known methods. According to one exemplary method, the continuous reinforcing fiber (A) may be added to a solution having a treatment agent dissolved therein, so as to allow the treatment agent to adhere onto the surface of the continuous reinforcing fiber (A). Alternatively, the treatment agent may be air-blown onto the surface of the continuous reinforcing fiber (A). Still alternatively, the continuous reinforcing fiber (A) preliminarily treated with surface treatment agent or other treatment agent may be used, or, the commercial product may be once cleaned off the surface treatment agent or other treatment agent, and may be surface-treated again so as to adjust the amount of treatment agent to a desired value.

<<Continuous Thermoplastic Resin Fiber (B)>>

The continuous thermoplastic resin fiber (B) in this invention is defined to be a thermoplastic resin fiber longer than 6 mm, and is preferably a thermoplastic resin fiber longer than 30 mm. Although not specifically limited, the continuous thermoplastic resin fiber (B) used in this invention preferably has an average fiber length of 1 to 20,000 m from the viewpoint of good buildability, which is more preferably 100 to 10,000 m, and even more preferably 1,000 to 7,000 m.

The continuous thermoplastic resin fiber (B) used in this invention includes a thermoplastic resin composition that contains the thermoplastic resin b as a major ingredient. For example, the thermoplastic resin b accounts for 80% by weight or more of the thermoplastic resin composition, and more specifically accounts for 90 to 100% by weight. Hence, the thermoplastic resin composition may be composed solely of the thermoplastic resin b, or any known additive may suitably be added besides the thermoplastic resin b.

The thermoplastic resin b has a wide range of choice among those used for the commingled yarn. Employable thermoplastic resins include polyolefin resins such as polyethylene and polypropylene; polyamide resin; polyester resins such as polyethylene terephthalate and polybutylene terephthalate; polycarbonate resin; polyoxymethylene resin; polyetherketone; polyethersulfone; and thermoplastic polyetherimide. Polyamide resin is preferable. Details of the thermoplastic resin composition and polyamide resin, used in this invention, will be detailed later.

Although depending on types of resin to be used, the thermoplastic resin b preferably has a melting point of 165 to 390° C., which is more preferably 165 to 375° C., even more preferably 165 to 305° C., yet more preferably 175 to 295° C., and furthermore preferably 185 to 285° C.

For the case where the thermoplastic resin b employs a high-melting-point resin, a possible choice is highly heat resistant thermoplastic resin known as super engineering plastics. Examples of the super engineering plastics include AURUM (registered trademark) from Mitsui Chemicals, Inc., and Victrex (registered trademark) PEEK Series from Victrex plc.

The thermoplastic resin b may be given by single component, or two or more components. When given by two or more components, the melting point of the thermoplastic resin b, whose melting point is lowest of all, preferably falls within the above-described ranges. For the case where the thermoplastic resin b has two or more melting points, the lowest melting point is defined as the melting point of the thermoplastic resin b.

The continuous thermoplastic resin fiber (B) used in this invention is, in most cases, manufactured by using a continuous thermoplastic resin fiber bundle in which continuous thermoplastic resin fibers are gathered into a bundle. A single continuous thermoplastic resin fiber bundle preferably has a total fineness of 40 to 600 dtex, which is more preferably 50 to 500 dtex, and even more preferably 100 to 400 dtex. Within these ranges, the obtainable commingled yarn will have therein better dispersion of the continuous thermoplastic resin fiber (B). The number of fibers that composes such continuous thermoplastic resin fiber bundle is preferably 1 to 200 f, which is more preferably 5 to 100 f, even more preferably 10 to 80 f, and particularly preferably 20 to 50 f. Within these ranges, the obtainable commingled yarn will have therein better dispersion of the continuous thermoplastic resin fiber (B).

In this invention, it is preferable to use 1 to 100 continuous thermoplastic resin fiber bundles, in order to manufacture a single commingled yarn, which is more preferably 1 to 50 bundles, and even more preferably 3 to 25 bundles. Within these ranges, the effect of this invention will more effectively be demonstrated.

The total fineness of the continuous thermoplastic resin fiber used for composing a single commingled yarn is preferably 200 to 12,000 dtex, and more preferably 1,000 to 6,000 dtex. Within these ranges, the effects of this invention will more effectively be demonstrated.

The total number of fibers of the continuous thermoplastic resin fiber (B) used for composing a single commingled yarn is preferably 10 to 2,000 f, more preferably 20 to 1,600 f, and even more preferably 200 to 350 f. Within these ranges, the commingled yarn will have improved commingling performance, and thereby the obtainable three-dimensional structure will have improved physical properties and texture. With the number of fibers controlled to 10 f or above, the opened fibers will be more likely to mix evenly. Meanwhile, when controlled to 2,000 f or below, a region where either fiber is concentrated is less likely to occur, making it possible to give more uniform commingled yarn.

The continuous thermoplastic resin fiber bundle used in this invention preferably has a tensile strength of 2 to 10 gf/d.

<<<Thermoplastic Resin Composition>>>

As described above, the continuous thermoplastic resin fiber used in this invention preferably includes the thermoplastic resin composition that contains the thermoplastic resin b as a major ingredient, and more preferably includes the polyamide resin composition that contains polyamide resin as a major ingredient.

The thermoplastic resin composition used in this invention may contain an elastomer component.

The elastomer component employable here include known elastomers such as polyolefin-based elastomer, diene-based elastomer, polystyrene-based elastomer, polyamide-based elastomer, polyester-based elastomer, polyurethane-based elastomer, fluorine-containing elastomer, and silicone-based elastomer, and is preferably polyolefin-based elastomer and polystyrene-based elastomer. For the purpose of improving the compatibility with the polyamide resin, also preferably used are elastomers which are modified using α,β-unsaturated carboxylic acid and anhydride thereof, or acrylamide and derivatives thereof, in the presence or absence of a radical initiator.

The amount of consumption of the elastomer component, when blended to the thermoplastic resin composition, is preferably 5 to 25% by weight of the thermoplastic resin composition.

To the thermoplastic resin composition used in this invention, it is permissible to add additives such as antioxidant, heat stabilizer and other stabilizers, hydrolysis resistance modifier, weathering stabilizer, matting agent, UV absorber, nucleating agent, plasticizer, dispersion aid, flame retardant, antistatic agent, anticoloring agent, antigelling agent, colorant, and mold releasing agent, so long as the purpose and effects of this invention will not adversely be affected. As for details on the additives, the description in paragraphs [0130] to [0155] of JP-B1-4894982 may be referred to, the contents of which are incorporated by reference into this specification. The thermoplastic resin composition used in this invention may also contain a filler, but preferably does not contain the filler. More specifically, this means that the filler content in the thermoplastic resin composition is 3% by weight or less.

One preferred embodiment of the thermoplastic resin composition used in this invention is such that polyamide resin accounts for 70% by weight or more (preferably 80% by weight or more, and more preferably 90% by weight or more) of the thermoplastic resin composition.

<<<Polyamide Resin>>>

The polyamide resin used in this invention is exemplified by polyamide 4, polyamide 6, polyamide 11, polyamide 12, polyamide 46, polyamide 66, polyamide 610, polyamide 612, polyhexamethylene terephthalamide (polyamide 6T), polyhexamethylene isophthalamide (polyamide 6I), polyamide 66/6T, polyxylylene adipamide, polyxylylene sebacamide, polyxylylene dodecamide, polyamide 9T, polyamide 9MT, and polyamide 6I/6T.

Among these polyamide resins, considering the buildability and heat resistance, the polyamide resin preferably contains a structural unit derived from diamine and a structural unit derived from dicarboxylic acid, wherein xylylenediamine-derived polyamide resin (occasionally referred to as "XD-based polyamide", hereinafter) preferably accounts for 50 mol % or more of the structural unit derived from diamine. Use of low hygroscopic polyamide, such as XD-based polyamide, polyamide 11 or polyamide 12, will more effectively suppress bubbling in the obtainable three-dimensional structure.

When the polyamide resin is a mixture, the ratio of XD-based polyamide in the polyamide resin is preferably 50% by weight or more, and more preferably 80% by weight or more.

The XD-based polyamide is preferably such that 70 mol % or more, more preferably 80 mol % or more, even more preferably 90 mol %, and particularly preferably 95 mol % or more of the structural unit derived from diamine is derived from metaxylylenediamine and/or paraxylylenediamine, and such that preferably 50 mol % or more, more preferably 70 mol % or more, even more preferably 80 mol % or more, yet more preferably 90 mol % or more, and furthermore preferably 95 mol % or more of the structural unit derived from dicarboxylic acid is derived from straight-chain aliphatic α,ω-dicarboxylic acid preferably having 4 to 20 carbon atoms.

Diamines employable as the starting diamine component of the XD-based polyamide, but other than metaxylylenediamine and paraxylylenediamine, include aliphatic diamines such as tetramethylenediamine, pentamethylenediamine, 2-methylpentanediamine, hexamethylenediamine, heptamethylenediamine, octamethylenediamine, nonamethylenediamine, decamethylenediamine, dodecamethylenediamine, 2,2,4-trimethyl-hexamethylenediamine, and 2,4,4-trimethylhexamethylenediamine; alicyclic diamines such as 1,3-bis(aminomethyl)cyclohexane, 1,4-bis(aminomethyl) cyclohexane, 1,3-diaminocyclohexane, 1,4-diaminocyclohexane, bis(4-aminocyclohexyl)methane, 2,2-bis(4-aminocyclohexyl)propane, bis(aminomethyl)decalin, and bis (aminomethyl)tricyclodecane; and aromatic diamines such as bis(4-aminophenyl)ether, paraphenylenediamine, and bis (aminomethyl)naphthalene, among which every single compound may be used independently, or two or more compounds may be combined for use.

When diamines other than xylylenediamine is used as the diamine component, such diamine preferably accounts for less than 50 mol %, preferably 30 mol % or less, more preferably 1 to 25 mol %, and particularly preferably 5 to 20 mol %.

The straight-chain aliphatic α,ω-dicarboxylic acid having 4 to 20 carbon atoms, suitably used as the starting dicarboxylic acid component of the polyamide resin, is exemplified by aliphatic dicarboxylic acids such as succinic acid, glutaric acid, pimelic acid, suberic acid, azelaic acid, adipic acid, sebacic acid, undecanedioic acid, and dodecanedioic acid, which may be used independently, or may be used as a mixture of two or more compounds. Among them, adipic acid or sebacic acid is preferable since the polyamide resin will have the melting point suitable for formability. Sebacic acid is more preferable.

Examples of the dicarboxylic acid component, other than the straight-chain aliphatic α,ω-dicarboxylic acid having 4 to 20 carbon atoms, include phthalic acid compounds such as isophthalic acid, terephthalic acid, and orthophthalic acid; and naphthalenedicarboxylic acid available in isomers including 1,2-naphthalenedicarboxylic acid, 1,3-naphthalenedicarboxylic acid, 1,4-naphthalenedicarboxylic acid, 1,5-naphthalenedicarboxylic acid, 1,6-naphthalenedicarboxylic acid, 1,7-naphthalenedicarboxylic acid, 1,8-naphthalenedicarboxylic acid, 2,3-naphthalenedicarboxylic acid, 2,6-naphthalenedicarboxylic acid, and 2,7-naphthalenedicarboxylic acid. Every single compound may be used independently, or two or more compounds may be combined for use.

When the dicarboxylic acid, other than the straight-chain aliphatic α,ω-dicarboxylic acid having 4 to 20 carbon atoms, is used as the dicarboxylic acid component, it is preferable to use terephthalic acid or isophthalic acid from the viewpoint of formability and barrier performance. Ratio of terephthalic acid or isophthalic acid in the structural unit derived from dicarboxylic acid is 30 mol % or less, more preferably 1 to 30 mol %, and particularly 5 to 20 mol %.

As the components for composing the polyamide resin, besides the diamine component and the dicarboxylic acid component, employable as copolymerizable component are lactams such as ε-caprolactam and laurolactam; and aliphatic aminocarboxylic acid such as aminocaproic acid and aminoundecanoic acid, so far as they will not adversely affect the effects of this invention.

The polyamide resin used in this invention preferably has a number-average molecular weight (Mn) of 6,000 to 30,000, which is more preferably 8,000 to 28,000, even more preferably 9,000 to 26,000, yet more preferably 10,000 to 24,000, and particularly preferably 11,000 to 22,000. Within these ranges, the heat resistance, elastic modulus, dimensional stability, and buildability may further be improved.

The number-average molecular weight (Mn) in this context is given by the equation below, using the terminal amino group concentration $[NH_2]$ (μeq/g) and terminal carboxy group concentration [COOH] (μeq/g) of the polyamide resin.

Number-average molecular weight(Mn)=2,000,000/
([COOH]+[NH$_2$])

The polyamide resin used in this invention preferably has a polydispersity (weight-average molecular weight/number-average molecular weight (Mw/Mn)) of 1.8 to 3.1. The polydispersity is more preferably 1.9 to 3.0, and even more preferably 2.0 to 2.9. With the polydispersity controlled within these ranges, it will become more easy to obtain the three-dimensional structure that excels in mechanical properties.

The polydispersity of polyamide resin is controllable, typically by suitably selecting types and amounts of initiator or catalyst used for polymerization, and polymerization conditions including reaction temperature, pressure and temporal duration. Alternatively, it is also controllable by mixing two or more types of polyamide resins obtained under different conditions and have different average molecular weights, or by subjecting the polyamide resin after being polymerized to fractional precipitation.

The polydispersity may be determined by GPC as a standard polymethyl metacrylate equivalent value, specifically by using "HLC-8320GPC" from Tosoh Corporation as equipment, two units of "TSKgel Super HM-H" from Tosoh Corporation as columns, a 10 mmol/l sodium trifluoroacetate solution in hexafluoroisopropanol (HFIP) as an eluant, at a resin concentration of 0.02% by weight, column temperature of 40° C., flow rate of 0.3 ml/min, and using refractive index detector (RI). An analytical curve is prepared by dissolving six levels of concentration of PMMA into HFIP and by measuring the values.

The polyamide resin when moistened preferably has a flexural modulus retention of 85% or above. With the flexural modulus retention controlled within such range in the moistened state, the built-up article will tend to cause not so much degradation of physical properties under high temperature and high humidity, and to cause less warpage or other dimensional changes.

Now, the flexural modulus retention of the polyamide resin in the moistened state is defined by a ratio (%) of the flexural modulus of a bending test specimen with a water absorption of 0.5% by weight, to the flexural modulus of the bending test specimen with a water absorption of 0.1% by weight absorption, wherein the test piece is obtained by molding the polyamide resin according to JIS K7171. Larger values of retention mean that the flexural modulus is less likely to be lowered in the moistened state. The flexural modulus in this context means value obtained from measurement according to JIS K7171.

The flexural modulus retention in the moistened state is more preferably 90% or above, and even more preferably 95% or above.

The flexural modulus retention of the polyamide resin in the moistened state is controllable based, for example, on ratio of mixing of paraxylylenediamine and metaxylylenediamine. The larger the ratio of paraxylylenediamine, the better the flexural modulus retention. Alternatively, it is also controllable based on crystallinity of the bending test specimen.

Water absorption of the polyamide resin, when measured by immersing a bending test specimen molded according to JIS K7171 in water at 23° C. for a week, then taken out, wiped off the water, and measured immediately thereafter, is preferably 1% by weight or less, more preferably 0.6% by weight or less, and even more preferably 0.4% by weight or less. Within these ranges, the built-up article will be less likely to deform due to water absorption, and will have less void formed therein since bubbling of water during melting of the thermoplastic resin b may be suppressed.

The polyamide resin suitably used here has a terminal amino group concentration ([NH$_2$]) of preferably less than 100 µeq/g, more preferably 5 to 75 µeq/g, and even more preferably 10 to 60 µeq/g; and, a terminal carboxy group concentration ([COOH]) of preferably less than 150 µeq/g, more preferably 10 to 120 µeq/g, and even more preferably 10 to 100 µeq/g. The polyamide resin given these terminal group concentration values will tend to stabilize its viscosity when processed into film or fiber, and to improve reactivity with a carbodiimide compound described later.

Ratio of the terminal amino group concentration to the terminal carboxy group concentration ([NH$_2$]/[COOH]) is preferably 0.7 or smaller, more preferably 0.6 or smaller, and particularly preferably 0.5 or smaller. If the ratio is larger than 0.7, the polyamide resin could face difficulty in controlling the molecular weight during polymerization.

The terminal amino group concentration may be determined by dissolving 0.5 g of polyamide resin into 30 ml of a phenol/methanol (4:1) mixed solvent at 20 to 30° C. under stirring, and by titrating the solution with 0.01 N hydrochloric acid. The terminal carboxy group concentration may be determined by dissolving 0.1 g of polyamide resin into 30 ml of benzyl alcohol at 200° C., 0.1 ml of phenol red solution is added thereto at 160° C. to 165° C., and by titrating the solution with a titrant prepared by dissolving 0.132 g of KOH in 200 ml of benzyl alcohol (0.01 mol KOH per liter), where the end point is detected based on change of color from yellow to red, staying in red thereafter, to calculate the concentration.

As for the method for manufacturing the polyamide resin, descriptions in paragraphs [0052] to [0053] of JP-A-2014-173196 may be referred to, the contents of which are incorporated by reference into this specification.

In this invention, the polyamide resin preferably has a melting point of 150 to 310° C., which is more preferably 180 to 300° C., and even more preferably 180 to 250° C.

The polyamide resin also preferably has a glass transition point of 50 to 100° C., which is more preferably 55 to 100° C., and particularly 60 to 100° C. Within these ranges, the heat resistance will tend to improve.

Now, the melting point in this invention is defined by temperature at which an endothermic peak observed in DSC (differential scanning calorimetry) peak top temperature. The glass transition point is determined by once heating and melting a sample to clear the influence on crystallizability caused by thermal history, and then by heating the sample again.

The measurement employs a DSC apparatus, approximately 1 mg of sample, nitrogen gas as an atmospheric gas at a flow rate of 30 ml/min, and a heating rate of 10° C./min. The sample is heated from room temperature up to a predicted melting point or above, and the melting point may be determined from temperature at which the endothermic peak top in the process of melting. Next, the molten polyamide resin is rapidly cooled on dry ice, and again heated at a heating rate of 10° C./min up to the melting point or above, to determine the glass transition point and the melting point. The DSC apparatus employable here is DSC-60 from Shimadzu Corporation, for example.

<<Treatment Agent for Continuous Thermoplastic Resin Fiber (B)>>

It is also preferable to treat the surface of the continuous thermoplastic resin fiber (B) used in this invention using some treatment agent. According to such embodiment, the continuous reinforcing fiber (A) will disperse more evenly in the commingled yarn. Types of the treatment agent are not specifically limited, so long as they can size the continuous thermoplastic resin fiber (B). The treatment agent is exemplified by ester-based compound, alkylene glycol-based compound, polyolefin-based compound, and phenylether-based compound. More specifically, surfactant is preferable.

The amount of consumption of the treatment agent for the continuous thermoplastic resin fiber (B) is preferably 0.1 to 2% by weight of the continuous thermoplastic resin fiber (B), which is more preferably 0.5 to 1.5% by weight. Within these ranges, the continuous thermoplastic resin fiber (B) will disperse more evenly, and thereby more uniform commingled yarn will be obtained more easily. In the process of manufacturing the commingled yarn, the continuous thermoplastic resin fiber (B) would have broken due to frictional force exerted from machine or among fibers. In contrast, within the above described ranges, the fiber will be prevented from breaking more effectively. The continuous thermoplastic resin fiber (B), to which mechanical stress is applied in order to obtain a uniform commingled yarn, is also effectively prevented from braking due to such stress.

<<Method for Treating Continuous Thermoplastic Resin Fiber (B) Using Treatment Agent>>

Method for treating the continuous thermoplastic resin fiber (B) with the treatment agent is not specifically limited, so long as an intended purpose will be achieved. For example, the continuous thermoplastic resin fiber (B) may be added to a solution having a treatment agent dissolved therein, so as to allow the treatment agent to adhere onto the surface of the continuous thermoplastic resin fiber (B). Alternatively, the treatment agent may be air-blown onto the surface of the continuous thermoplastic resin fiber (B).

<Thermoplastic Resin Fiber (C)>

Next, the thermoplastic resin fiber (C), which is a reinforcing member for the commingled yarn, will be explained. The thermoplastic resin fiber (C) is, in most cases, a continuous thermoplastic resin fiber, with the length thereof suitably determined depending on a desired length of the 3D printer filament. More specifically, the length is preferably within the range from 1 to 20,000 m, more preferably 100 to 10,000 m, and even more preferably 1,000 to 7,000 m.

The diameter of thermoplastic resin fiber (C) is preferably 0.5 to 2.5 mm, and more preferably 1.0 to 1.8 mm. Within these ranges, the filament will be excel in continuous productivity.

The thermoplastic resin fiber (C) used in this invention includes a thermoplastic resin composition that contains the thermoplastic resin c as a major ingredient. Now, "as a major ingredient" means that the thermoplastic resin c accounts for 80% by weight or more of the thermoplastic resin composition, and furthermore 90 to 100% by weight. Hence, the thermoplastic resin composition may be composed solely of the thermoplastic resin c, or any known additive may suitably be added besides the thermoplastic resin c. Details of the thermoplastic resin c are same as those for the thermoplastic resin b, and the same will apply to the preferred ranges. The same will also apply to the additives which may be added to the thermoplastic resin fiber (C). That is, the preferred ranges regarding the thermoplastic resin composition that composes the thermoplastic resin fiber (C) are same as the preferred ranges regarding the thermoplastic resin composition that composes the thermoplastic resin fiber (B). Accordingly, the preferred ranges regarding the melting point and so forth of the thermoplastic resin c are same as the preferred ranges regarding the melting point and so forth of the thermoplastic resin b.

The thermoplastic resin c preferably has a moisture content of 5.0% or below, which is more preferably 2.0% or below. The lower limit value may be, but not limitatively, 0.1% or above. With the moisture content controlled to 5.0% or below, the built-up article will effectively be suppressed from bubbling inside it.

Method for measuring moisture content follows the description later in EXAMPLES.

The thermoplastic resin c may be given by single component, or two or more components. When given by two or more components, the melting point of the thermoplastic resin c, whose melting point is lowest of all, preferably falls within the above-described ranges. For the case where the thermoplastic resin c has two or more melting points, the lowest melting point is defined as the melting point of the thermoplastic resin c.

The thermoplastic resin fiber (C) may be a monofilament or multifilament. The monofilament is preferable. When given as multifilament, the number of fibers is preferably 16 to 540 f, and more preferably 24 to 108 f.

A treatment agent may be used for sizing the thermoplastic resin fiber (C) into bundle. The treatment agent preferably employed here may be same as those for the continuous thermoplastic resin fiber (B) described previously.

In the 3D printer filament of this invention, the thermoplastic resin b and the thermoplastic resin c may be the same resin, or may be different resins. It is, however, preferable that the difference between the melting point of the thermoplastic resin b that composes the thermoplastic resin (B), and the melting point of the thermoplastic resin fiber (C) that composes the thermoplastic resin is 50° C. or smaller, more preferably 40° C. or smaller, and even more preferably 30° C. or smaller. The lower limit value may be 0° C., but not specifically limited thereto. Within these ranges, the filament will be discharged more stably, and will be highly buildable.

EXAMPLES

This invention will further be detailed referring to Examples. Note that materials, amounts of consumption, ratios, process details and procedures may suitably modified, without departing from the spirt of this invention. The scope of this invention is therefore not limited to specific Examples described below.

1. Thermoplastic Resin

<Exemplary Synthesis 1: MPXD10>

Into a reactor equipped with a stirrer, a partial condenser, a total condenser, a thermometer, a dropping funnel, a nitrogen gas feeding tube and a strand die, placed were 10 kg (49.4 mol) of sebacic acid (TA grade, from Itoh Oil Chemicals Co., Ltd.) and 11.66 g of sodium acetate/sodium hypophosphite monohydrate (molar ratio=1/1.5), the inside of the reactor was thoroughly replaced with nitrogen gas, and the reaction system was heated up to 170° C. under stirring while feeding a small flow rate of nitrogen.

Into the molten sebacic acid, added under stirring was 6.647 kg of a mixed xylylenediamine that contains metaxylylenediamine (from Mitsubishi Gas Chemical Company, Inc.) and paraxylylenediamine (from Mitsubishi Gas Chemical Company, Inc.) with a molar ratio of 70/30 (34.16 mol of metaxylylenediamine, and 14.64 mol of paraxylylenediamine), and the inner temperature was continuously elevated up to 240° C. over 2.5 hours, while removing water released from the condensation reaction.

After completion of the dropping, the inner temperature was elevated, and upon reaching 250° C., the inside of the reactor was decompressed, the inner temperature was further elevated, kept at 255° C. for 20 minutes, so as to sustain melt polycondensation. The system was then pressurized with nitrogen gas, the resultant polymer was taken out through the strand die, and then pelletized to obtain polyamide resin MPXD10.

The thus obtained polyamide resin was found to have a melting point of 213° C., and a number-average molecular weight of 15,400.

<Exemplary Synthesis 2: MXD10>

Polyamide resin MXD10 was synthetized in the same way as in Exemplary Synthesis 1, except that metaxylylenediamine was used as the starting diamine, in place of the mixed xylylenediamine.

The thus obtained polyamide resin was found to have a melting point of 190° C., and a number-average molecular weight of 15,000.

MXD6: Metaxylylene adipamide resin, S6001 from Mitsubishi Gas Chemical Company, Inc., melting point 237° C., number-average molecular weight=16,800

Ny6: Polyamide resin 6, 1022B from Ube Industries, Ltd., melting point 220° C.

2. Continuous Reinforcing Fiber (A)

CF-1: Pyrofil-TR-505 from Mitsubishi Rayon Co., Ltd., 8,000 dtex, the number of fibers=12,000 f, surface treated with epoxy resin.

CF-2: Pyrofil-TR-505 from Mitsubishi Rayon Co., Ltd., 4,000 dtex, the number of fibers=6,000 f, surface treated with epoxy resin.

GF-1: from Nitto Boseki Co., Ltd., 1,350 dtex, the number of fibers=800 f.

3. Manufacture of Commingled Yarn (Manufacture of Continuous Thermoplastic Resin Fiber (B))

The above-described thermoplastic resins were made into fibers according to the procedures below.

Each thermoplastic resin was melted in a single screw extruder with a 30 mm-diameter screw, and extruded through a 48 hole-die into strands, drawn while being taken up onto a roll, to obtain a fiber bundle of the thermoplastic resin in the form of roll. The melting temperature was set 20° C. higher than the melting point of the thermoplastic resin b.

Note that the continuous thermoplastic resin fiber (Ny66 fiber) used for commingled yarn 5 was Leona from Asahi Kasei Fibers Corporation, with melting point 265° C., 235 dtex/35 f.

(Manufacture of Commingled Yarn)

The commingled yarn was manufactured according to the procedures below.

Fibers were individually drawn from ten rolls (200 m rolls) of the continuous thermoplastic resin fiber (B) and one roll (200 m-roll) of continuous reinforcing fiber (A), and opened under air blow, while allowing them to pass a plurality of guides. During the opening process, the continuous thermoplastic resin fibers (B) and the continuous reinforcing fiber (A) were bundled, further allowed to pass through a plurality of guides under air blow for advanced uniformity. The thus obtained fiber bundle was dipped in an aqueous solution containing a treatment agent (AQ nylon T70 from Toray Industries, Inc.) for 10 seconds, then dried at 40° C. for 60 minutes, to obtain a commingled yarn. The concentration of the treatment agent in the aqueous solution was adjusted to give the amount of coating of treatment agent listed in Table 1.

(Fineness of Commingled Yarn)

Weight per total fineness of a fiber used for manufacturing 1 m of commingled yarn was measured, and then converted into fineness (dtex).

(Measurement of Dispersity)

The commingled yarn was cut, embedded by an epoxy resin, a cross section of the embedded commingled yarn taken normal to the longitudinal direction was polished, and the cross section was photographed under an ultra-deep color 3D shape measurement microscope VK-9500 (controller unit)/VK-9510 (measurement unit) (from Keyence Corporation). As illustrated in FIG. 4, six additional lines were radially drawn at equiangular intervals on an obtained image, and the lengths of regions of the individual continuous reinforcing fiber (A) that fall on each additional line were measured to be a1, a2, a3 . . . ai (i=n). The lengths of regions of the individual continuous thermoplastic resin fiber (B) that fall on each additional line were concurrently measured to be b1, b2, b3 . . . bi (i=m). The dispersity of the continuous reinforcing fiber was determined by the equation below:

[Mathematical Formula 1]

$$\left[1 - \left(\frac{1}{n \text{ or } m} \times \frac{\sum_{j=1}^{n \text{ or } m}(a_i \text{ or } b_i)}{\sum_{j=1}^{n \text{ or } m}(a_i) + \sum_{j=1}^{n \text{ or } m}(b_i)}\right)\right] \times 100 \, (\%)$$

(Measurement of Impregnation Rate)

The commingled yarn was cut, embedded by an epoxy resin, a cross section of the embedded commingled yarn taken normal to the longitudinal direction was polished, and the cross section was photographed under an ultra-deep color 3D shape measurement microscope VK-9500 (controller unit)/VK-9510 (measurement unit) (from Keyence Corporation). On the thus obtained cross-sectional image, regions in the continuous reinforcing fiber (A) partially melted and infiltrated with a component derived from the continuous thermoplastic resin fiber (B) were selected using image analyzing software ImageJ, and the area was measured. The impregnation rate was given by [Area of region in continuous reinforcing fiber (A) infiltrated with component derived from continuous thermoplastic resin fiber (B)]/[Area of photographed cross section] (in %).

TABLE 1

|  | Commingled Yarn 1 | Commingled Yarn 2 | Commingled Yarn 3 | Commingled Yarn 4 | Commingled Yarn 5 | Commingled Yarn 6 |
|---|---|---|---|---|---|---|
| Type of Continuous Reinforcing Fiber (A) | CF-2 | CF-2 | CF-2 | CF-1 | CF-2 | GF-1 |
| Type of Thermoplastic Resin b which constituting Continuous Thermoplastic Resin Fiber (B) | MPXD10 | MXD6 | MPXD10 | MPXD10 | Ny66 | MXD10 |
| Melting Point of Thermoplastic Resin b (° C.) | 213 | 237 | 213 | 213 | 265 | 190 |
| Fineness of Commingled Yarn (dtex) | 6442 | 6907 | 6442 | 13814 | 6366 | 6442 |
| Dispersity (%) | 76 | 80 | 76 | 76 | 72 | 71 |
| Infiltration Rate (%) (Before Bonding to Reinforcing Member) | 0 | 0 | 0 | 0 | 0 | 0 |

TABLE 1-continued

|  | Commingled Yarn 1 | Commingled Yarn 2 | Commingled Yarn 3 | Commingled Yarn 4 | Commingled Yarn 5 | Commingled Yarn 6 |
|---|---|---|---|---|---|---|
| Amount of Coating of Treatment Agent (%) | 0.5 | 0.5 | 1 | 0.5 | 0.5 | 0.4 |
| Content Ratio of Continuous Reinforcing Fiber in the Commingled Yarn (Wt %) | 62 | 57 | 62 | 62 | 62 | 69 |

4. Manufacture of Thermoplastic Resin Fiber (C)

Thermoplastic resins c listed in Table 2 below were made into fibers, by the method below.

Each thermoplastic resin c was melted in a single screw extruder, extruded into strands, drawn while being taken up onto a roll so as to achieve the filament diameter and the filament summarized in Table 2, to thereby obtain a thermoplastic resin fiber bundle (monofilament) in the form of roll. The melting temperature was set 20° C. higher than the melting point of the resin.

The thus obtained thermoplastic resin fiber (C) was also measured regarding the fiber diameter and moisture content.

(Measurement of Fiber Diameter)

The fiber diameter was measured using an ultra-deep color 3D shape measurement microscope VK-9500 (controller unit)/VK-9510 (measurement unit) (from Keyence Corporation).

(Measurement of Moisture Content)

At 25° C., 1.0 of the thermoplastic resin fiber (C) was cut, and the moisture content was measured by the Karl Fischer method, while setting temperature of a measuring instrument 5° C. lower than the melting point of the thermoplastic resin fiber c, stand-by time to 0 seconds, and measurement time to 30 minutes. Using 0 g of the sample, the moisture content was measured under the same conditions for blank measurement. The moisture content of the sample was determined by the equation below.

Moisture content=[(Moisture content of test specimen)−(Moisture content of blank)]/(Weight of test specimen)

The unit is "% by weight".

The measuring instrument used in this Example was a moisture meter CA-200 and a sample charger VA-236S from Mitsubishi Chemical Analytech Co., Ltd.

TABLE 2

|  | Resin Fiber C-1 | Resin Fiber C-2 | Resin Fiber C-3 |
|---|---|---|---|
| Type of Resin Fiber c | MPXD10 | MXD6 | Ny6 |
| Diameter of Thermoplastic Resin Fiber (C) (mm) | 1.5 | 1.2 | 1.5 |
| Moisture Conetent of Thermoplastic Resin Fiber (C) (Wt %) | 0.17 | 0.32 | 2.6 |

Example 1

(Manufacture of 3D Printer Filament)

The commingled yarn 1 was spirally wound around the resin fiber C-1 while bringing them into contact, according to the ratio of commingled yarn in filament listed in Table 3 below. The wound article was subjected to heat sealing at a sealing temperature listed in Table 3 (20° C. higher than the melting point of the thermoplastic resin b or the melting point of the thermoplastic resin c, whichever is lower) for 1.0 second, to thereby obtain a 3D printer filament.

The thus obtained 3D printer filament was measured regarding the diameter (in mm), using an ultra-deep color 3D shape measurement microscope VK-9500 (controller unit)/VK-9510 (measurement unit) (from Keyence Corporation).

(Evaluation of Impregnation Rate)

The impregnation rate of the commingled yarn in the thus obtained filament was measured in the same way as described above, and evaluated according the criteria below.

A: not less than 0% and less than 10%
B: not less than 10% and less than 30%
C: not less than 30% and less than 80%
D: not less than 80%

(Measurement of Elastic Modulus)

Preparation of Test Specimen

A 15 mm long piece was cut out from the 3D printer filament to be tested. Then as illustrated in FIG. 5(a), one end of the 15-mm long 3D printer filament 51 was then embedded up to 10 mm depth in a resin to form a 25-mm diameter cylinder shape, to thereby obtain a test specimen of 15 mm high, with a 5-mm long 3D printer filament portion.

Test Method

The thus obtained test specimen was inserted into a 25 mm diameter, 20 mm high cylindrical hole of an aluminum jig 53 illustrated in FIG. 5(b), while directing the cylindrical resin part 52 directed downward. In FIG. 5(b), the upper drawing is a top view of the jig, and the lower drawing is a front elevation of the jig. Next, as illustrated in FIG. 5(c), a 25 mm diameter, disk-like weight 54 was fitted from above the cylindrical resin part 52 into the jig, to thereby pressurize the 3D printer filament portion to be tested. A load cell employed here was of 50 N or 500 kN class, and the elastic modulus was measured at a testing speed of 0.2 mm/min, under a load range of 50N (Examples 3, 7, Comparative Example 2) or 1 kN (Examples 1, 2, 4 to 6, Comparative Example 1).

(Manufacture of Three-Dimensional Structure using 3D Printer)

The filament obtained above was set to Solidoodle 3 (from Solidoodle), and extruded onto a Kapton film so as to draw a circle, at a temperature 40° C. higher than the melting point of the thermoplastic resin b, at a drawing speed 5 mm/sec. The stage was heated to a temperature 100° C. lower than the melting point. Solidoodle 3 used here had been modified by connecting thereto a variable transformer, so as to enhance the output. The obtained three-dimensional structure was found to be 1 mm thick at the thinnest portion.

(Extrudability)

In the manufacture of the three-dimensional structure using the 3D printer, extrudability of the filament through the nozzle was evaluated as below.

A: Filament smoothly extruded.
B: Filament extruded, needing occasional adjustment for resolving entanglement or curling.
C: Filament extruded, needing frequent adjustment for resolving entanglement of curling.
D: Filament not extruded.

(Evaluation of Three-Dimensional Structure)
((Amounts of Voids and Bubbles))

The thus obtained three-dimensional structure was cut by a freely selectable section, the cut piece was embedded by an epoxy resin, a cross section of the embedded commingled yarn taken normal to the longitudinal direction was polished, and the cross section was photographed under an ultra-deep color 3D shape measurement microscope VK-9500 (controller unit)/VK-9510 (measurement unit) (from Keyence Corporation). Occurrence of voids and bubbles was observed on the obtained photograph.

- A: Voids and bubbles not, or slightly observed.
- B: Voids and bubbles observed, only at a practically acceptable level.
- C: Voids and bubbles observed, at a practically non-acceptable level.
- D: Other than A to C (three-dimensional structure not manufacturable, for example).

((Buildability))

The thus obtained three-dimensional structure was visually observed, and evaluated as below.

- A: Three-dimensional structure obtained as designed.
- B: Three-dimensional structure obtained as designed, with a slight surface irregularity.
- C: Three-dimensional structure obtained, but not as designed.
- D: Other than A to C (three-dimensional structure not manufacturable, for example).

Example 2

The processes were conducted in the same way as in Example 1, except that the commingled yarn and the thermoplastic resin fiber (C) were replaced by those listed in Table 3.

Example 3

Three commingled yarns 3 were fed to a braiding machine (from Kokubun Limited), and a 20 g/m braid (3D printer filament) made of commingled yarns was manufactured at a take-up speed of 10 cm/min.

The thus obtained braid was set to Solidoodle 3 (from Solidoodle), and the three-dimensional structure was manufactured and evaluated, in the same way as in Example 1.

Example 4

The processes were conducted in the same way as in Example 1, except that, as summarized in Table 3, only the commingled yarn 4 was heated for 5 seconds at the temperature listed in Table 3, without using the thermoplastic resin fiber (C).

Example 5

The processes were conducted in the same way as in Example 1, except that the commingled yarn and the thermoplastic resin fiber (C) were replaced by those listed in Table 3.

Example 6

The processes were conducted in the same way as in Example 1, except that the commingled yarn was replaced by that listed in Table 3.

Example 7

The processes were conducted in the same way as in Example 1, except that the commingled yarn 1 per se was directly set to Solidoodle 3.

Comparative Example 1

The processes were conducted in the same way as in Example 1, except that, in place of the commingled yarn, continuous carbon fiber CF-1 was spirally and directly wound around the thermoplastic resin fiber C-1, while controlling the ratio of carbon fiber (continuous reinforcing fiber) to a value listed in Table 3.

Comparative Example 2

One continuous carbon fiber CF-1 and 32 resin fibers C-1 (233 dtex) were fed to a braiding machine (from Kokubun Limited), and a 1.55 g/m braid (comparative 3D printer filament) was manufactured at a take-up speed of 10 cm/min.

Using the thus obtained filament, the process was conducted in the same way as in Example 1.

TABLE 3

| | Example 1 | Example 2 | Example 3 | Example 4 | Example 5 | Example 6 | Example 7 | Comparative Example 1 | Comparative Example 2 |
|---|---|---|---|---|---|---|---|---|---|
| Type of Commingled Yarn | Commingled Yarn 1 | Commingled Yarn 2 | Commingled Yarn 3 | Commingled Yarn 4 | Commingled Yarn 5 | Commingled Yarn 6 | Commingled Yarn 1 | Not Used | Not Used |
| Type of Thermoplastic Resin Fiber (C) | Resin Fiber C-1 | Resin Fiber C-2 | Not Used | Not Used | Resin Fiber C-3 | Resin Fiber C-1 | Not Used | Resin Fiber C-1 | Resin Fiber C-1 |
| Content Ratio of Thermoplastic Resin Fiber (C) in Filament (Wt %) | 54 | 54 | 0 | 0 | 54 | 54 | 0 | 71 | 40 |
| Content Ratio of Commingled Yarn in Filament (Wt %) | 46 | 46 | 100 | 100 | 46 | 46 | 100 | 0 | 0 |
| Content Ratio of Continuous Reinforcing Fiber (A) in Filament (wt %) | 33 | 33 | 60 | 60 | 33 | 45 | 60 | 29 | 60 |
| Infiltration Rate of Commingled Yarn Contained in Filament | B | B | A | C | B | B | A | — | — |

TABLE 3-continued

|  | Example 1 | Example 2 | Example 3 | Example 4 | Example 5 | Example 6 | Example 7 | Comparative Example 1 | Comparative Example 2 |
|---|---|---|---|---|---|---|---|---|---|
| Heat Sealing Temperature (° C.) | 233° C. | 257° C. | Not Heat Sealed | 233° C. Heat Treatment of Commingled Yarn Itself | 240° C. | 210° C. | Not Heat Sealed | Not Heat Sealed | Not Heat Sealed |
| Diameter of Filament (mm) | 1.8 | 1.5 | 2.2 | 0.9 | 1.8 | 1.8 | 1.5 | 1.5 | 2.2 |
| Elastic Modulus of Filament (MPa) | 2620 | 2840 | 18 | 5510 | 1750 | 1900 | 5 | 1810 | 21 |
| Extrudability | A | A | A | A | A | A | B | B | B |
| Three-dimensional Structure (Voids and Bubbles) | A | A | B | A | B | A | B | C | C |
| Three-dimensional Structure (Buildability) | A | A | A | A | A | A | B | C | B |

As is clear from the results, Examples using the 3D printer filament of this invention yielded the three-dimensional structures with less contents of internal voids or bubbles (Examples 1 to 7).

The three-dimensional structures were also found to show good discharging property and buildability, when the filament having an elastic modulus of 10 MPa or larger was used (Examples 1 to 6).

In contrast, the internal voids or bubbles were observed when the filament of Comparative Example 1 or 2 was used. The filaments of Comparative Examples 1 and 2 were also found to be less discharging property. The filament of Comparative Example 1 had a high elastic modulus, but was less discharging property, presumably because the thermoplastic resin fiber, wounded by carbon fiber but not by the commingled yarn, could not easily be integrated with the carbon fiber, unlike the case where the commingled yarn was used. Meanwhile, the result of Comparative Example 2 was attributable to insufficient impregnation, since the commingled yarn was not used.

Note that, in Example 1, the same results were obtained even if the resin fiber C-1 was replaced by a multi-filament with the same fineness and a number of filament of 48f.

REFERENCE SIGNS LIST 11 three-dimensional structure
12 thermoplastic resin
13 continuous reinforcing fiber
14 void
21 3D printer
22 3D printer nozzle
23 3D printer stage
24 3D printer filament
25 three-dimensional structure
51 3D printer filament
52 cylindrical resin part
53 jig
54 disk-like weight

What is claimed is:

1. A 3D printer filament comprising a commingled yarn that contains a continuous reinforcing fiber (A) and a continuous thermoplastic resin fiber (B), with a dispersity of the continuous reinforcing fiber (A) in the commingled yarn of 60 to 100%;
   wherein a component derived from a portion of the continuous thermoplastic resin fiber (B) has an impregnation rate in the continuous reinforcing fiber (A) of not less than 10% and less than 80%;
   the 3D printer filament further comprises a reinforcing member for the commingled yarn;
   the reinforcing member is a thermoplastic resin fiber (C) and a monofilament; and
   the thermoplastic resin fiber (C) has a moisture content of 0.17% to 2.0% and a diameter of 0.5 to 2.5 mm.

2. The 3D printer filament of claim 1, wherein the filament has an elastic modulus of 10 MPa or larger, where the elastic modulus is measured by embedding an end of a 15 mm-long filament up to 10 mm-depth by a resin to form a 25 mm-diameter cylinder shape; by inserting the cylindrical resin part directed downward into a 25 mm-diameter, 20 mm-high cylindrical hole of a jig; by fitting a 25 mm-diameter disk-like weight from above the cylindrical resin part into the jig, to thereby apply load at a testing speed of 0.2 mm/min.

3. The 3D printer filament of claim 1, wherein the continuous reinforcing fiber (A) is longer than 30 mm.

4. The 3D printer filament of claim 1, wherein the continuous thermoplastic resin fiber (B) contains thermoplastic resin b as a constituent, which is a polyamide resin.

5. The 3D printer filament of claim 1, wherein the continuous thermoplastic resin fiber (B) contains thermoplastic resin b as a constituent, which is a polyamide resin that contains a structural unit derived from diamine and a structural unit derived from dicarboxylic acid, and, 50 mol % or more of the structural unit derived from diamine is derived from xylylenediamine.

6. The 3D printer filament of claim 1, wherein the continuous reinforcing fiber (A) is a carbon fiber or a glass fiber.

7. The 3D printer filament of claim 1, wherein the commingled yarn is spirally wound around the thermoplastic resin fiber (C).

8. The 3D printer filament of claim 1, wherein a difference between a melting point of a thermoplastic resin b that composes the thermoplastic resin fiber (B), and a melting point of a thermoplastic resin c that composes the thermoplastic resin fiber (C) is 50° C. or smaller.

9. The 3D printer filament of claim 1, wherein the continuous reinforcing fiber (A) includes a polyacrylonitrile-based carbon fiber and/or pitch-based carbon fiber.

10. The 3D printer filament of claim 1, wherein the component derived from a portion of the continuous thermoplastic resin fiber (B) has an impregnation rate in the continuous reinforcing fiber (A) of 10% or larger and smaller than 30%.

11. The 3D printer filament of claim 1, wherein the continuous reinforcing fiber (A) or the continuous thermoplastic resin fiber (B) accounts for 95% by weight or more of continuous reinforcing fibers that composes the commingled yarn.

12. The 3D printer filament of claim 1, wherein the commingled yarn includes 100 to 100,000 f of the continuous reinforcing fiber (A) and continuous thermoplastic resin fiber (B) in total, per a single commingled yarn.

13. The 3D printer filament of claim 1, which has a cross sectional shape of circular.

14. The 3D printer filament of claim 1, which has a diameter of 0.5 mm to 3.0 mm.

* * * * *